US006863108B1

(12) United States Patent
Hui

(10) Patent No.: US 6,863,108 B1
(45) Date of Patent: Mar. 8, 2005

(54) REINFORCING RING APPLICATOR

(76) Inventor: Lap-Sun Hui, 300 Sycamore, Bradbury, CA (US) 91010

(*) Notice: Subject to any disclaimer, the term of this patent is extended or adjusted under 35 U.S.C. 154(b) by 0 days.

(21) Appl. No.: 10/765,747

(22) Filed: Jan. 27, 2004

(51) Int. Cl.[7] .................................................. B32B 31/18

(52) U.S. Cl. ........................ 156/513; 156/515; 156/530; 156/564; 156/565

(58) Field of Search ................................. 156/251, 252, 156/253, 257, 261, 513, 514, 515, 517, 518, 530, 564, 565, 570

(56) References Cited

U.S. PATENT DOCUMENTS

| | | | | |
|---|---|---|---|---|
| 2,353,232 A | | 7/1944 | Greene | |
| 2,441,821 A | | 5/1948 | Kendall | |
| 2,512,822 A | | 6/1950 | Barsh | |
| 2,561,387 A | | 7/1951 | Lo Forese | |
| 2,583,944 A | | 1/1952 | Hirszson et al. | |
| D193,231 S | | 7/1962 | Klein | |
| 3,898,919 A | | 8/1975 | Grimaldi, Jr. | |
| 4,007,653 A | | 2/1977 | Cady | |
| 4,072,554 A | | 2/1978 | McKibben | |
| 4,285,531 A | | 8/1981 | Balsamo | |
| 4,289,565 A | | 9/1981 | Wilkins | |
| 4,310,379 A | | 1/1982 | Harrison | |
| 4,431,325 A | | 2/1984 | Colby | |
| 4,662,770 A | | 5/1987 | Block | |
| 4,687,536 A | * | 8/1987 | Hiramatsu et al. | 156/556 |
| 4,713,995 A | | 12/1987 | Davi | |
| 4,746,394 A | | 5/1988 | Sueta et al. | |
| 4,826,561 A | | 5/1989 | Carroll | |
| 4,853,268 A | | 8/1989 | Hansen | |
| 4,909,893 A | | 3/1990 | Lee | |
| 5,125,350 A | | 6/1992 | Frye et al. | |
| 5,188,694 A | | 2/1993 | Hashida et al. | |
| 5,340,229 A | | 8/1994 | Schwartzman | |
| 5,364,200 A | | 11/1994 | Russo et al. | |
| 5,658,421 A | | 8/1997 | Carroll | |
| D390,773 S | | 2/1998 | Harrington, Jr. | |
| 6,106,915 A | | 8/2000 | Ruben | |
| 6,206,070 B1 | | 3/2001 | Salmon | |

* cited by examiner

*Primary Examiner*—James Sells
(74) *Attorney, Agent, or Firm*—Fulwider Patton Lee & Utecht, LLP

(57) ABSTRACT

An applicator and reinforcer dispensing assembly for reinforcing holes in sheets of paper and other sheet materials that applies flat reinforcement rings about holes formed in those sheets is provided. A plurality of reinforcement rings are stacked one atop each other and are dispensed by the applicator. Various mechanisms for ensuring that the reinforcing rings are properly positioned in the applicator prior to application are also provided. A combination hole punch and reinforcing ring applicator is also provided.

10 Claims, 6 Drawing Sheets

REINFORCING RING APPLICATOR

BACKGROUND OF THE INVENTION

1. Field of the Invention:

The present invention relates to a combination hole puncher and reinforcer by means of which holes are punched in sheets of material, such as paper, and concurrently reinforced with flat, annular rings around the holes.

2. General Background and State of the Art

In offices throughout the world hole punching devices have been utilized for many years so as to punch holes in sheets of paper, and sometimes plastic sheets, to allow those sheets to be secured in files. Sheets of paper are often punched at the top with a pair of holes that allow them to be secured at the top to files using pronged fasteners. Other types of hole punchers are used to punch holes in papers and other sheets of material along the sides to allow them to be secured in ring binders.

A problem that has persisted through the years is that considerable stress is often applied to the structure of papers fastened in files in the area immediately surrounding the punched holes. The papers then tear through the short distance of material between the holes and the edges of the sheets of paper near which they are formed. When this occurs the sheets will no longer remain in the file.

One system for remedying this situation that has been available for many years is the use of flat, annular reinforcing rings that may secured to the areas surrounding the punched holes. These reinforcing rings are typically formed of a material of greater strength than the paper in which the holes are punched. The reinforcing rings are coated with either a moisture-sensitive or pressure-sensitive adhesive and are applied to the sheet of paper or other material once the holes have been punched.

The principal problem with this prior arrangement is that it has historically been performed manually. The task of reinforcing punched holes in the hundreds, and even thousands, of sheets papers that are secured in files by the manual application of such reinforcing rings is often so labor intensive as to be impractical. Consequently, this system of reinforcement, while used to some extent, is not prevalent.

One attempt to alleviate this problem is to incorporate hole reinforcement on each sheet of paper before the paper is used. It is possible to buy pre-punched and pre-reinforced paper, where the holes are either individually reinforced, or where a strip of reinforcement material has been added one of the margins of the paper. However, such reinforcement results in the paper being thicker. Thus, when the paper is packaged for sale, typically in a ream, approximately 500 sheets, additional storage space is needed for the same amount of paper. Moreover, the reinforcements add to the cost of the paper. This is undesirable since not all holes typically need reinforcement.

Various hole puncher and reinforcer devices have been created in attempts to provide alternative way of reinforcing the structure of sheets of paper around punched holes therein. Numerous machines have been fabricated that draw segments of adhesive tape from rolls and secure them to sheets of paper or plastic contemporaneously with the perforation of those sheets. When such devices operate properly, the sheets of paper are provided with short sections of tape at the edges of the papers in which the holes are formed. Holes are punched through both the segments of tape and the underlying paper or other sheet material.

These tape reinforcement devices also have, to a large extent, proved impractical. The feed mechanisms for the tape often jam and the tape often adheres to parts of the punching machines as it is fed toward the location on the sheets of paper at which it is to be applied.

Another problem with systems employing adhesive tape to reinforce the areas about punched holes is that the punch mechanism must penetrate not only the paper in which the fastening apertures are to be formed, but also the tape as well. Since the tape is coated with pressure-sensitive adhesive, articles of adhesive are transferred to the punch mechanism. This creates a certain gumminess in the punch mechanism that reduces the effectiveness of the punch in creating apertures. Also a build-up of adhesive in the punch mechanism contributes to the fouling of the tape as the tape is fed into position to be pressed against the paper.

INVENTION SUMMARY

The present invention comprises a novel applicator for applying reinforcers to holes punched in a sheet of paper. More specifically, the present invention includes various method of mounting a reinforcer dispensing assembly to the applicator for reinforcing holes in paper, as well as embodiments where adjusting the position of reinforcers on a shaft of dispensing assembly is either done manually or automatically. Further, in another aspect, the dispensing assembly may be configured to include a hole punch such that a hole may be punched in a sheet of paper and then reinforced in one action.

In one aspect, the present invention is embodied in a system for applying reinforcing rings to a sheet of paper, comprising: a first arm and a second arm, the first and second arms each having a first end and a second end, the first arm being hingedly connected at its second end to the second end of the second arm, the first and second arms each having an inner surface, with the inner surfaces of the first and second arms facing each other, a strike plate mounted on the inner surface of the second arm adjacent the first end of the second arm, a reinforcer dispensing assembly mounted adjacent to the first end of the first arm, the reinforcer dispensing assembly positioned to cooperate with the strike plate, the reinforcer dispensing assembly including at least one reinforcing ring removably mounted on a shaft, the shaft having a proximal end and a distal end, the proximal end of the shaft configured to mount removably connect the proximal end of the shaft to the first end of the first arm, and a compression ring mounted on the shaft at a location proximal to the at least one reinforcing ring, the compression ring configured to adjust the position of the of the reinforcing ring on the shaft.

In another aspect, the present invention includes a system wherein the reinforcing ring has a top side and a bottom side, and also has an adhesive layer applied to the bottom side. In another embodiment, the shaft has an outer surface with threads disposed thereon, and the compression ring has a top side and a bottom side and an opening extending therethrough, the opening having an inner wall having threads configured to cooperate with the threads of the shaft such that rotation of the compression ring causes the compression ring to translate along the shaft in a longitudinal direction.

In yet another aspect, the system of the present invention includes a shaft that has an outer surface with a plurality of ridges disposed thereon, and the compression ring has a top side and a bottom side and an opening extending therethrough, the opening having an inner wall, the compression ring also having a ratchet arm disposed in the opening and configured to cooperate with the plurality of ridges on the shaft to provide one way translation of the compression ring on the shaft to apply pressure on the at least one reinforcing ring to move the at least one reinforcing ring towards the distal end of the shaft, and to prevent movement of the at least one reinforcing ring towards the proximal end of the shaft.

In another aspect, the present invention is embodied in a system wherein the reinforcer dispensing assembly is removably attached to the inner surface of the first arm. In an alternative aspect, the first arm has a bore having a first diameter disposed on a top surface of the first arm and extending through a portion of the first arm, and a second bore having a second diameter less than the diameter of the first bore, the second bore centered axially in relation to the axis of the first bore, the second bore extending from the first bore through the first arm, and wherein the first diameter is larger than a diameter of the compression ring and the second diameter is smaller than the diameter of the compression ring and larger than a diameter of the at least one reinforcing ring, such that the first and second bores accommodate the insertion of the reinforcer dispensing assembly and allow the distal end of the shaft upon which is mounted the at least one reinforcing ring to protrude from the opening of the second bore on the bottom of the first arm.

In one embodiment, the invention includes: a plug having an outer diameter sized to cooperate with the first diameter of the first bore, the plug having a top side and a bottom side, the plug also having a central bore having a diameter greater than a diameter of the shaft extending from the bottom side of the plug into the plug for a selected distance, the plug configured to maintain the reinforcer dispensing assembly within the first bore of the first arm. Alternatively, other methods of mounting the dispensing assembly may be used, such as, for example, making one of the collar or arm from a ferromagnetic material, that is, a material that is attracted to a magnet, and making the other of the arm or collar from a magnetized material.

In still another aspect, the present invention is embodied in a reinforcer dispensing assembly, comprising: a shaft having a proximal end and distal end and an outer surface, the outer surface having a plurality of ridges disposed thereon, a collar having a central hole extending from a top side to a bottom side of the collar, the central hole sized to receive the shaft and to allow the collar to move longitudinally along the shaft, a ratchet arm disposed within the central hole and mounted to the collar, the ratchet arm configured to cooperated with the plurality of ridges of the shat to control the movement of the collar along the shaft such that the collar is constrained to move in only one direction on the shaft.

In one embodiment, the present invention includes at least one reinforcing ring removably mounted on the shaft adjacent the distal end of the shaft and at a location on the shaft distal to the location of the collar on the shaft. In another embodiment, the at least one reinforcing ring has a top side and a bottom side, the bottom side having an adhesive layer disposed thereon. In a still further aspect, the distal end of the shaft of the dispensing assembly is configured as a hole punch.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
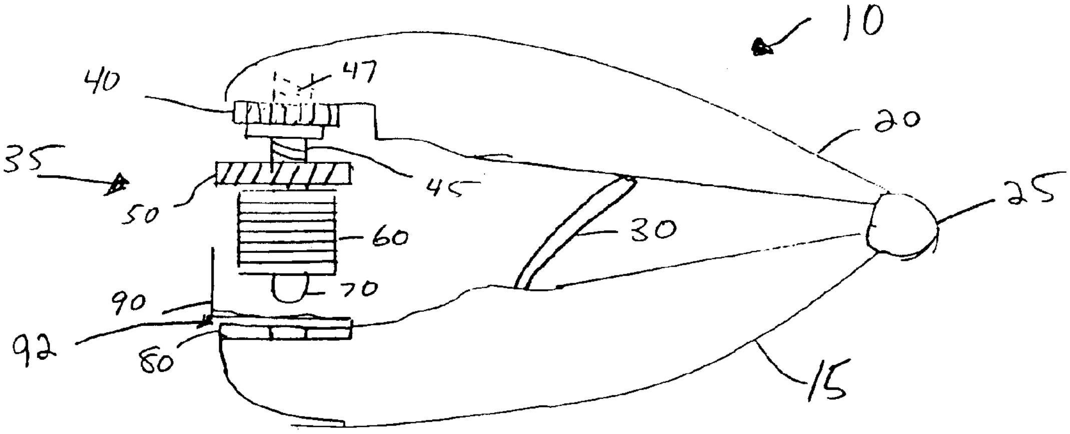
FIG. 1 is a side view of one embodiment of a hole reinforcement applicator incorporating aspects of the present invention.

Referring now to the drawings in detail, in which like reference numerals indicate like or corresponding elements among the several figures, there is shown in FIG. 1 a hole reinforcer applicator 10 in accordance with one aspect of the present invention. Applicator 10 has a lower applicator arm 15 pivotally attached to upper applicator arm 20 by hinge assembly 25. Upper applicator arm 20 is biased apart from lower applicator arm 15 by spring member 30. Spring member 30 is an arm of a resilient plastic, which may be the same material as used to form lower and upper applicator arms 15, 20. Spring member 30 is fixed at one end to either lower or upper applicator arms 15, 20, with the other end being free, allowing lower and upper applicator arms to be pulled apart to allow loading of reinforcer dispensing assembly 35 into applicator 10.

Reinforcer dispensing assembly 35 comprises a shaft 45 upon which are mounted one or more reinforcers 60. Reinforcer dispensing assembly 35 is removably mounted at a location adjacent to the end of upper applicator arm 20 opposite hinge 25. A proximal end 47 of shaft 45 is inserted into a hole (not shown) at the end of applicator arm 20 to removably mount reinforcer dispensing assembly 35 to the upper applicator arm 20. Various means may be used to removably attached the distal end 47 of shaft 45 in the hold. For example, the hole in applicator arm 20 may be threaded to receive a threaded portion of shaft 45. Alternatively, the diameter of the hole may be slightly smaller than the diameter of proximal end 47, providing for a press fit between the walls of the hold and the outer diameter of proximal end 47. In yet another embodiment, the hold may have serrations that removably interact with either threads or similar serrations on the outside of proximal end 47 of shaft 45, allowing proximal end 47 to be inserted into the hold wherein the serrations of the hold and the serrations on the shaft would interact maintain proximal end 47 in the hole until force was applied to the shaft 45, pulling proximal end 47 from the hole in upper applicator arm 20.

Figure 2:
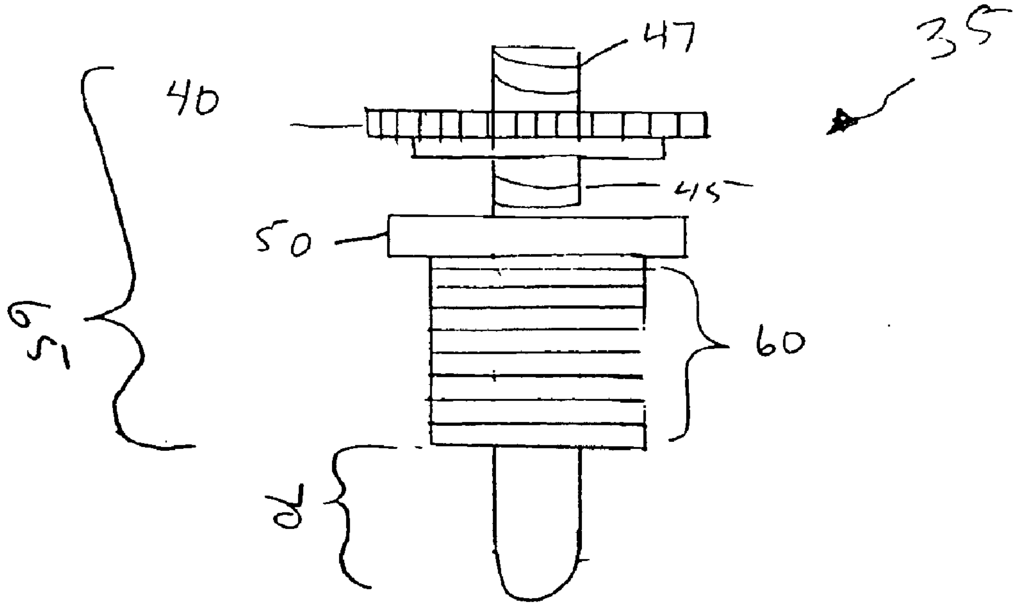
FIG. 2 is a side view of one embodiment of a reinforcer dispensing assembly in accordance with the present invention.

Referring now to FIG. 2, one embodiment of reinforcer dispensing assembly 35 in accordance with the present invention is shown. In this embodiment, shaft 45 has a threaded portion 65 and a non-threaded portion 70. In this embodiment, a nut 40 is disposed on shaft 45 adjacent to proximal end 47. Nut for may be threaded onto the threaded portion of shaft 45, and then fixed in a desired location using a suitable adhesive, heat or cold staking or other mechanical means known in the art. Alternatively, shaft 45 and nut 40 are molded or machined such that they form one integral part. In some embodiments, the diameter of non-threaded portion 70 may be slightly larger than the diameter of the threaded portion. This increase in diameter assists in ensuring that the reinforcers 60 are retained on the non-threaded portion 70.

A pressure plate 50 has disposed approximately in the center portion of pressure plate 50 a hole that is threaded to receive the threads of the threaded portion 65 of shaft 45. One or more reinforcers 60 are movably mounted on shaft 45 below pressure plate 50. Since pressure plate 50 is threadably mounted on shaft 45, pressure plate 50 may be rotated to advance the location of pressure plate 50 along the length of the threaded portion 65 of shaft 45. In this manner, when pressure plate 50 is rotated such that the pressure plate moves along shaft 45 in a distal direction towards the non-threaded portion 70 of shaft 45, pressure plate 50 applies a force against the reinforcers 60 in a distal direction towards the non-threaded portion 70 of shaft 45 to move the reinforcers towards the non-threaded portion 70 of shaft 45.

Figure 3:
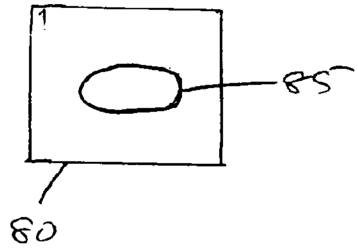
FIG. 3 is a top view of a portion of the applicator of FIG. 1

FIG. 3 shows the details of a strike plate 80 disposed at an end of lower applicator arm 15 opposite hinge 25. Strike plate 80 has a hole 85 extending through strike plate 80, Hole 80 located so that it may receive a distal end of non-threaded portion 70 of shaft 45 when a force is applied to lower and upper applicator arms 15, 20 sufficient to overcome the bias force of spring member 30 maintaining a separation between lower and upper applicator arms 15, 20. As the bias between lower and upper applicator arms 15, 20 is overcome, the ends of lower and upper applicator arms 15, 20 opposite hinge 25 move closer together, with the distal end of the shaft 45 eventually extending into and through hole 85 of strike plate 80. Hole 85 may be round, or it may be oval. Typically, the diameter of hole 85 will be slightly large than the diameter of shaft 45 to allow easy passage of the distal end of shaft 45 through hole 85. However, in order to provide sufficient support for a piece of paper on which is being applied a reinforcer, the diameter of hole 85 must be small enough so that pressure may be applied to the top of the reinforcer, and thus the paper, without pushing a portion of the paper into hole 85 such that the paper becomes distorted or tom.

As shown in FIG. 1, a guard 90 may also be mounted on the lower applicator arm 15 to keep fingers or other items from being pinched between lower and upper applicator arms 15, 20 when the arms are forced together to apply a reinforcer. Further, guard 90 defines a space 92 into which the paper which is to be reinforced is inserted. This ensures that the paper is inserted in the proper area of the applicator so that the reinforcement process can be accomplished most effectively and efficiently.

Referring again to FIG. 4, each reinforcer 60 is an annular ring having a central, circular opening 95 therethrough that facilitates mounting the reinforcer 60 on shaft 45. The central opening 95 defined through each of the reinforcers 60 typically has a diameter and cross-sectional area slightly less than the diameter and cross-sectional area of the shaft 45. The diameter of the central opening 95 may be any diameter as needed depending on the size of the hole to be reinforced. Typically, the diameter of central opening 95 is approximately the size required to reinforce holes having a diameter of 0.25 inches (United States standard) and 9.0 millimeters (International standard). The undersurface of each reinforcer 60 is coated with a pressure-sensitive adhesive, as will hereinafter be described.

The outer diameter of the reinforcer is typically fourteen and a half millimeters, while the diameter of the central opening through the reinforcer 60 is typically either six millimeters or seven millimeters, which are the standard sizes for use with conventional ring binders and prong fasteners. The reinforcer 60 is generally formed of, for example, polyethylene terephthalate (PET) which is preferably 0.05 millimeters in thickness. Those skilled in the art will immediately understand that other materials may be used for the reinforcer 60, provided only that they be sufficiently durable in relatively thin cross-section to provide reinforcement to a paper substrate.

The reinforcer 60 has an upper surface 100 that may be covered with a thin layer of a material that is resistant to adhesion, such as, for example, a silicone layer sprayed onto the upper surface 100. Such a coating serves to make the upper surface 100 of reinforcer 60 slick and adhesive resistant. That is, pressure-sensitive adhesive does not readily adhere to the silicone layer. Alternatively, reinforcer 60 may be formed from a material that is inherently adhesion resistant, such as where the material is formulated to include a release agent, or where adhesion resistance is a basic property of the material, as known by those skilled in the art.

A coating of pressure-sensitive adhesive or glue, indicated at 105, is then applied upon the undersurface of each reinforcer 60. This pressure sensitive adhesive or glue may be coated on the reinforcer 60 using a spray or dip process, or may be applied as a layer of adhesive onto a sheet of material from which the reinforcer 60 is subsequently stamped or cut from.

As illustrated in FIGS. 1 and 2, the reinforcers 60 are stacked one atop another with the adhesion resistant upper surface 100 facing upwardly, and the undersurface bearing the layer of adhesive 105 facing downwardly. A plurality of the stacked reinforcers 60 are mounted upon shaft 45 by forcing the stack of reinforcers 60 past the distal end of shaft 45 and onto shank shaft 45. The reinforcers 60 are sufficiently flexible so that they can be forced onto shaft 45 even though the outer diameter of shaft 45 is slightly greater than the inner diameter of the central aperture 95 through each of the reinforcers 60. When the stack of reinforcers 60 are mounted upon shaft 45 in this manner, they appear as a column formed of a multiplicity of thin, washer-shaped rings as illustrated in FIGS. 1 and 2.

The operation of the reinforcer applicator will now be described with reference to FIGS. 1–4. As is well known, holes that are punched in a piece of paper so that it may be placed on the ring of a binder frequently tear. For example, a person leafing through a binder may accidentally pull on the paper to vigorously such that the binder ring tears through the hole, leaving the hole useless to hold the paper on the binder ring. In such a case, it is useful to be able to apply a reinforcer to the area of the hole so as to compensate for the tear in the wall of the hole. Formally, as described previously, a paper ring having adhesive on one side was applied to the hole manually. Although care is usually taken by the person applying such a reinforcer, it is not unusual for the reinforcer to be applied off-center of the hole, such that the paper no longer mounts easily in the ring binder. Additionally, many such reinforcers require the adhesive to be moistened before application, which can be messy and un-hygienic. Furthermore, if the user touches the adhesive prior to or during mounting on a sheet of paper, the adhesion strength to the paper will be lessened, and the adhesive on the reinforcer may be rendered less transparent, such that when the reinforcer is applied to a sheet of paper, the reinforcer is more visible on the sheet of paper than it would have been if the adhesive layer was not touched.

The embodiments of the present invention improve the application of hole reinforcers by proving a system and method improving location of the reinforcer in relation to the hole, and, since the reinforcers are coated with a pressure sensitive adhesive, eliminating the need to moisten the adhesive prior to application. To use the applicator of the present invention, a piece of paper with a tom hole is placed in the slot 92 (FIG. 1) between guard 90 and strike plate 80. The paper is positioned so that the hole in the paper is beneath the distal tip of shaft 45. When the paper is positioned, force is applied to either the lower applicator arm 15, the upper applicator arm 20, or both simultaneously, to overcome the bias provided by spring member 30. As force is applied, and the bias of spring member 30 is overcome, the lower and upper applicator arms 15, 20 pivot at hinge 25 such that the ends of the arms 15, 20 opposite the hinge 25 move towards one another, resulting in the distal time of shaft 45 entering the hole in the paper and extending through the hole in the paper into the hole 85 in the strike plate 80.

With continued downward movement, the lowermost reinforcer 60 is brought into face-to-face contact with the upper surface of the sheet of paper in the area of the tom hole in the sheet of paper. The pressure-sensitive adhesive layer 105 on the lowermost reinforcer 60 is tightly pressed against the upwardly facing surface of the sheet of paper, surrounding the hole in the paper, due to the downward force applied by the pressure plate 50 through the stack of reinforcers 60 located beneath the pressure plate 50.

With the application of pressure to the lowermost reinforcer 60 by the pressure plate 50 through the stack of reinforcers 60 above, the lowermost reinforcer 60 tightly adheres to the sheet of paper. Consequently, the force overcoming the bias of spring member 30 is reduced, and ends of the lower and upper applicator arms 15, 20 opposite hinge 25 are biased apart, the lowermost reinforcer 60 remains adhesively attached to the upper surface of the sheet of paper due to the presence of the adhesive layer 105 on the underside of the lowermost reinforcer 60.

The next lowest reinforcer 60 is easily drawn free from the lowermost reinforcer 60 due to the presence of the release agent on the upper surface of the reinforcer 60. The pressure-sensitive adhesive 105 on the undersurface of the reinforcer 60 forms only a very weak bond with the release agent on the top of the next highest reinforcer 60, which is easily broken by the movement of the lower and upper applicator arms 15, 20 as they separate as the force overcoming the bias created by spring member 30 is relaxed.

The force of adhesion between the layer of adhesive 105 on the lowermost reinforcer 60 and the sheet of paper is quite strong. The adhesive bond is sufficiently strong so that even though the diameter of shaft 45 is slightly larger than the central opening 95 through the reinforcer 60, the upward force of the shaft 45 against the lowermost reinforcer 60 merely widens the opening 95 of the lowermost reinforcer 60, allowing the shaft 45 to pull through the reinforcer 60, and leaving the reinforcer 60 adhered to the sheet of paper.

However, the adhesive force between the adhesive layer 105 on the next lowest reinforcer 60 and the release agent atop the lowermost reinforcer 60 is so weak that the gripping force of the hole 95 of the next lowermost reinforcer 60 on the shaft 45 due to the difference in diameter of the hole 95 and shaft 45 is greater than the adhesive force between the adhesive layer 105 of the next lowermost reinforcer 60 and the release agent coated on the uppermost side 100 of the lowermost reinforcer 60. Thus, as the applicator arms separate, the next lowermost reinforcer 60, along with all of the remaining reinforcement rings stacked above it, is lifted away from the lowermost reinforcer that is now strongly adhered to the sheet of paper.

The reinforcers 60 may be sequentially applied, one after another. However, as each subsequent reinforcer 60 is peeled from the stack of reinforcers, the distance from the lowermost reinforcer 60 to the top surface of the sheet of paper is increased by the thickness of each reinforcer 60. Eventually, the distance between reinforcer 60 and the sheet of paper becomes great enough that the down motion of the stack of reinforcers due to operation of the applicator 10 results in misplacement of the reinforcer. Additionally, as reinforcers 60 are removed from shaft 45, the exposed length of shaft 45 increases. There may come a point where the distal end of shaft 45 bottoms strikes a portion of the lower applicator arm 15 below hole 85 in strike plate 80. When this occurs, the adhesive coated bottom of the lowermost reinforcer 60 may not contact the paper, or sufficient force may not be applied to the lowermost reinforcer 60 by the nut 50 to ensure that the reinforcer 60 firmly adheres to the sheet of paper. When this occurs, nut 50 may be rotated about shaft 45, the threads of which draw nut 50 in a downward direction, advancing the stack of reinforcers 60 along shaft 45 until the lowermost reinforcer 60 is once again optimally positioned for easy application to a sheet of paper.

Figure 5:
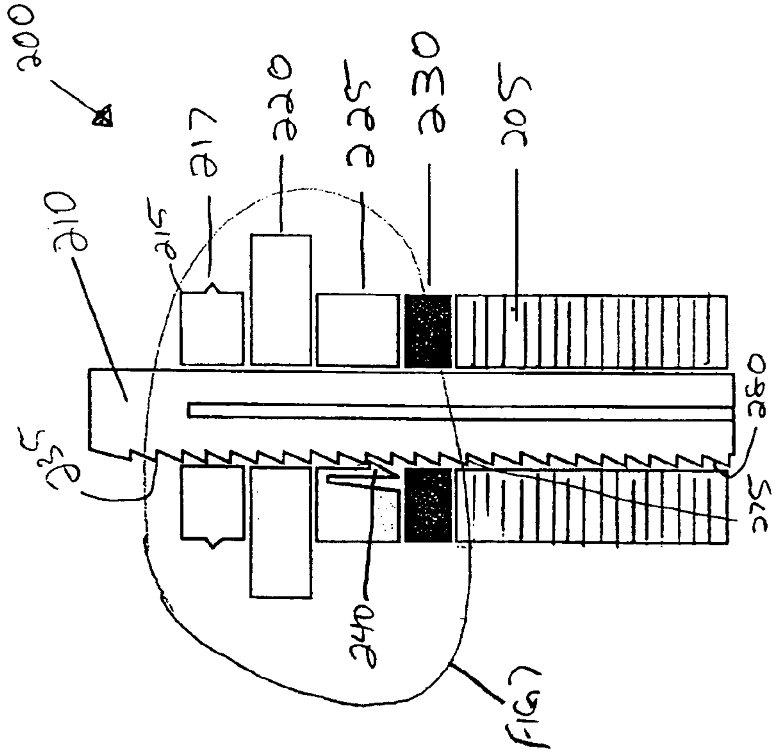
FIG. 5 is a cross-sectional view of another embodiment of a reinforcer dispensing assembly of the present invention depicting an automatic reinforcer positioning mechanism.
Figure 6:
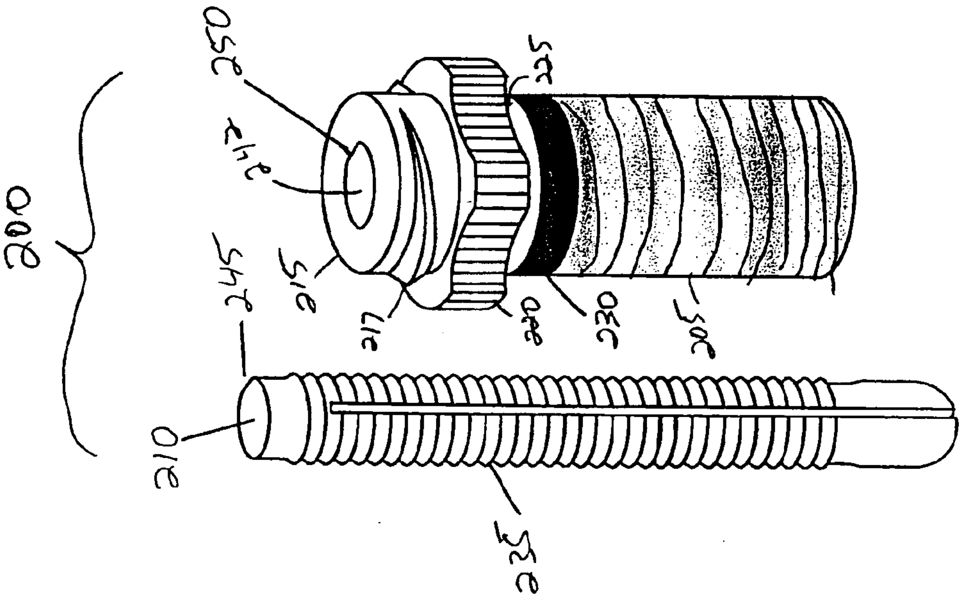
FIG. 6 is a perspective view of the reinforcer dispensing assembly of FIG. 5 showing additional details of the assembly.

Referring now to FIGS. 5 and 6, an alternative embodiment of the reinforcer dispensing assembly will now be described that automates the process of advancing the pressure ring down the shaft of the assembly to properly position the lowermost reinforcer for application to a sheet of paper. In this embodiment, reinforcer dispensing assembly comprises a stack of reinforcers 205 mounted upon a shaft 210. Also mounted on shaft 210, above the top of the stack of reinforcers 205, is a mounting collar 215, a knob 220, a ratcheting collar 225 and, in some embodiments, a cushion 230. Mounting collar includes a thread 217 for rotatably mounting the mounting collar 215 into a suitably threaded hole in the lower side of upper applicator arm 20 (FIG. 1). Although shown in FIG. 5 as separate parts, the features of mounting collar 215, knob 220 and ratcheting collar 230 may be formed as a single piece.

As shown in FIG. 6, and in the cutaway view of FIG. 5, there is an axially disposed opening in each of the mounting collar 215, the knob 220, the ratcheting collar 225, the cushion 230 and reinforcers 205. The opening in the mounting collar is identified by numeral 242 in FIG. 6. The diameter of the axial openings in the mounting collar 215, the knob 220, the ratcheting collar 225, the cushion 230 and reinforcers 205 is slightly larger than the diameter of shaft 210, allowing the mounting collar 215, the knob 220, the ratcheting collar 225, the cushion 230 and reinforcers 205 to freely slide on shaft 210. Shaft 210 has a flattened portion 245 that engages with a similar flattened portion 250 in each of mounting collar 215, the knob 220, the ratcheting collar 225 so that turning knob 220 to engage or disengage thread 217 of mounting collar 215 with the upper applicator arm 20 causes the entire reinforcer dispenser assembly to rotate, preventing independent rotation of the shaft 210 and the other constituents of the assembly which might cause a loss of reinforcers 205 from the assembly.

Figure 7:
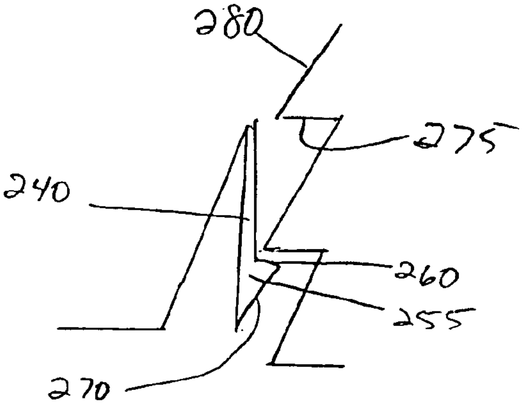
FIG. 7 is an enlarged cross-sectional view of a portion of the automatic reinforcer positioning assembly depicted in FIG. 5.

Referring now to FIGS. 5 and 7, shaft 210 includes a plurality of ridges or teeth formed about the outside diameter of shaft 210. Ratcheting collar 225 includes a ratchet arm 240 attached to ratcheting collar 225 and disposed at the inner wall of a hole extending axially through the center of ratcheting collar 225. When ratcheting collar 225 is mounted on shaft 210, ratchet arm 240 engages ridges 235 to form a one-way ratcheting mechanism. As illustrated in FIG. 7, ratchet arm 240 has a rider 255 having a locking portion 260 and a ramp portion 270. Ridge 235 also has a locking portion 275 and a ramp portion 280. As shown in FIG. 5, ratchet arm 240 is biased to engage a ridge 235 so that pressure on the top of shaft 210 causes the ratchet arm 240 to lock to a ridge 235 so that the force applied to the top of shaft 210 is transmitted downwardly through shaft 210 to position and press the lowermost reinforcer 205 against a sheet of paper. Once the bottom, or distal end of shaft 210 passes through the hole in the strike plate and encounters a land or plate, further downward pressure on the top of the assembly causes the stack of reinforcers to be forced downward and the ratchet assembly allows the shaft to move upwards in relation to the stack of reinforcers, ensuring that the stack of reinforcers is in the proper position for the next application of a reinforcer.

Figure 8A:
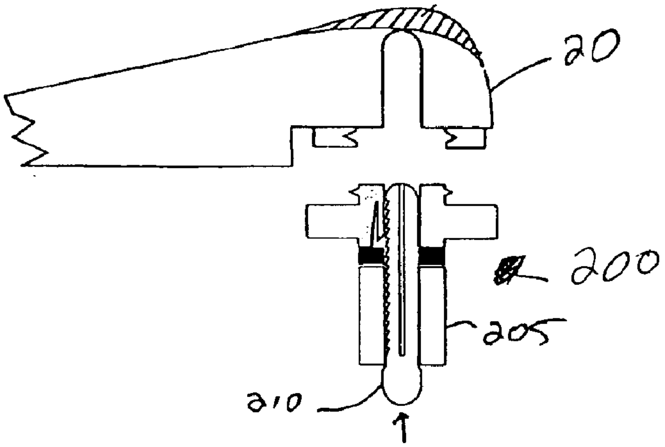
FIGS. 8A to 8D are side views, at least party in cross-section, illustrating operation of the automatic reinforcer positioning mechanism depicted in FIG. 5.
Figure 8B:
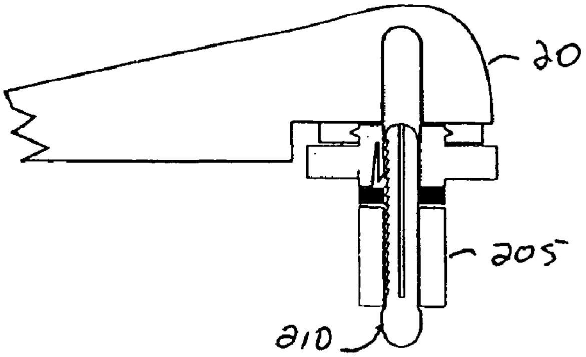
Figure 8C:
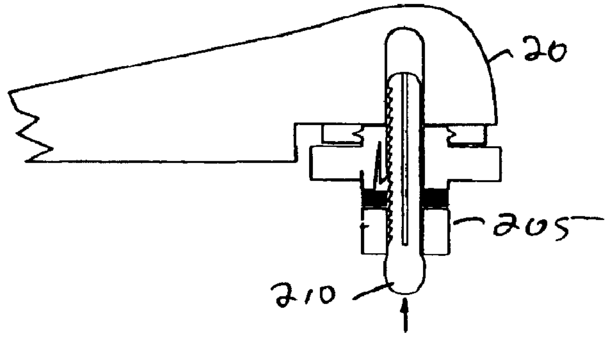
Figure 8D:
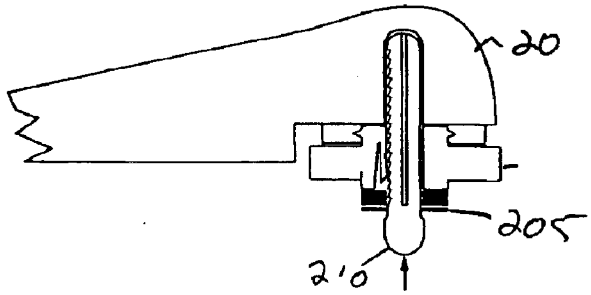

The operation of this embodiment of the reinforcer dispensing assembly is further illustrated in FIGS. 8A to 8D. The reinforcer dispensing assembly 200 is mounted in upper applicator arm 20 in FIG. 8A. Downward pressure on applicator arm 20 forces the lowermost reinforcer 205 into contact with a sheet of paper, the ratchet mechanism transferring the downward force to the stack of reinforcers 205 to apply and adhere the reinforcers 205 to the paper, as shown in FIG. 8B. As the reinforcers 205 are used up, the distal end of shaft 210 strikes a plate or land disposed in the lower applicator arm 15 below the strike plate 80. In striking this plate or land, upwards pressure is applied to the shaft 210, and ratchet mechanism 240 allows shaft 210 to move upwards relative to the stack of reinforcers 205, as shown in FIG. 8C. When upper applicator arm 20 is allowed to move upwards after applying the lowermost reinforcer 205 to the sheet of paper, ratchet mechanism 240 locks shaft 210 in place relative to the stack of reinforcers, transmitting the upward motion of the applicator arm to the stack of reinforcers, peeling the lowermost reinforcer 205 from the bottom of the stack. Because of the ratcheting mechanism and the upwards movement of shaft 210 relative to the stack of reinforcers 205, the lowermost reinforcer 205 is placed in proper position for the next application of the reinforcer to a sheet of paper.

Figure 9:
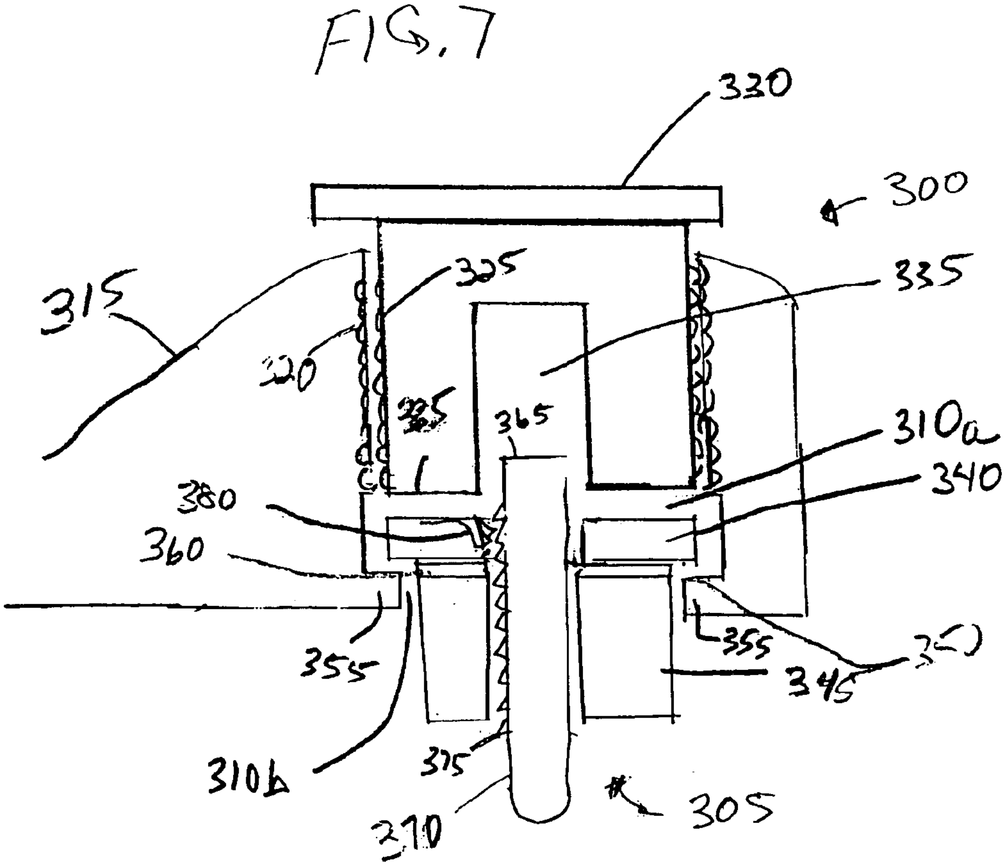
FIG. 9 is a cross-sectional view illustrating the details of an alternative embodiment of the present invention showing reinforcer positioning assembly mounted within a cavity of an applicator arm to facilitate loading and replacement of the reinforcer positioning assembly in the applicator body.

While the reinforcer dispensing assembly is shown as mounting to the underside of upper applicator arm 20 (FIG. 1), alternative designs are possible. For example, as shown in FIG. 9, an alternative applicator 300 may be designed wherein reinforcer dispensing assembly 305 is mounted within a cavity 310 formed within upper applicator arm 315. At least a portion of the sides of cavity 310 have threads or ridges 320 for engaging similar threads or ridges 325 formed on the outer side surface of a plug or cap 330. Cap or plug 330 includes a bore extending axially from an opening in the bottom surface of the cap or plug 330.

When cap or plug 330 is removed from upper applicator arm 315, cavity 310 is exposed, allowing a user to drop the reinforcer dispensing assembly 305 into cavity 310. The diameter of cavity 310 is sized so as to allow easy insertion and removal of reinforcer dispensing assembly 305, but also to accurately locate assembly 305 in the proper position to ensure proper placement and application of reinforcers 345 to a sheet of paper.

Cavity 310 has two portions, a larger diameter portion 310*a* and a smaller diameter portion 310*b* defined by ledges 355. Ledges 355 are part of upper applicator arm 315, and extend into larger diameter portion 310*a* to form smaller diameter portion 310*b* of cavity 310. The diameter of smaller diameter 310*b* is less than the diameter of collar 340, but larger than the diameter of the cushion 360 and reinforcer stack 345. When reinforcer dispensing assembly 305 is inserted into the larger diameter portion 310*a* of cavity 310, the bottom edges of collar 340 that extend beyond the diameter of the cushion 360 and reinforcer stack 345 rest upon the upper surface of ledges 355, thus allowing the cushion 360 and reinforcer stack 345 to extend through an opening in the bottom of the upper applicator arm 315 while providing support for collar 340 to retain the reinforcer dispensing assembly 305 within cavity 310.

As described previously, plug or cap 330 may be inserted or threadably mounted in cavity 310. The central bore 335 of plug or cap 330 is sized to receive the upper end 365 of shaft 370. As described previously, shaft 370 has ridges or teeth disposed about its outer surface that engage ratchet arm 380 of collar 340 to allow automatic upwards movement of shaft 370 into bore 335 to place the next lowermost reinforcer 345 in position for application to a sheet of paper. Plug or cap 330 has a bottom surface 385 that, when plug or cap 330 is inserted in to cavity 310*a*, engages the upper surface of collar 340 to hold collar 340, and thus reinforcer dispensing assembly 305, in place within cavity 310.

It will be immediately apparent to those skilled in the art that other designs could be used to allow quick and easy mounting of the reinforcer dispensing assembly of the present invention within or to an applicator arm without departing from the scope of the invention, and such alternatives are contemplated to be within the scope of the intended invention. For example, the collar may be made of a ferromagnetic material, and a magnet may be incorporated in the applicator arm adjacent the second bore to hold the collar in place in the arm without the need for a cap or plug. Alternatively, the positions of the magnet and ferromagnetic material may be reverse; that is, the arm may be made from a ferromagnetic material and the coller could be magnetized. Moreover, those skilled in the art will understand that the concepts of the present invention are equally applicable to devices designed to reinforce multiple holes in a sheet of paper simultaneous, such as used in conjunction with two-hole and three-hole binders, and that those applications are also within the intended scope of the contemplated invention.

Figure 10A:
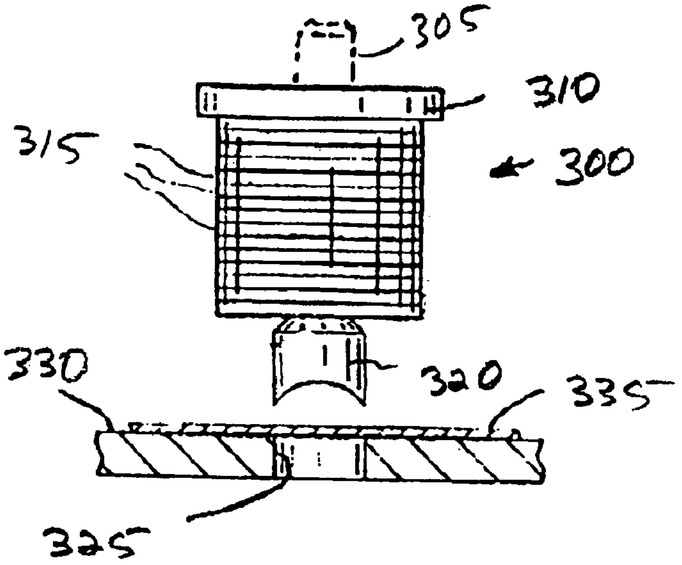
FIGS. 10A to 10C are side views, partly in cross-section, illustrating an embodiment of the present invention whereby a hole is punched and then reinforced utilizing a combination hole punch and reinforcer applicator.
Figure 10B:
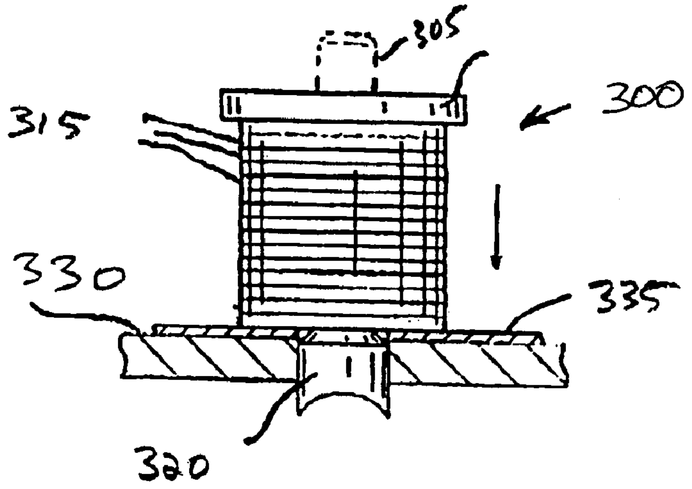
Figure 10C:
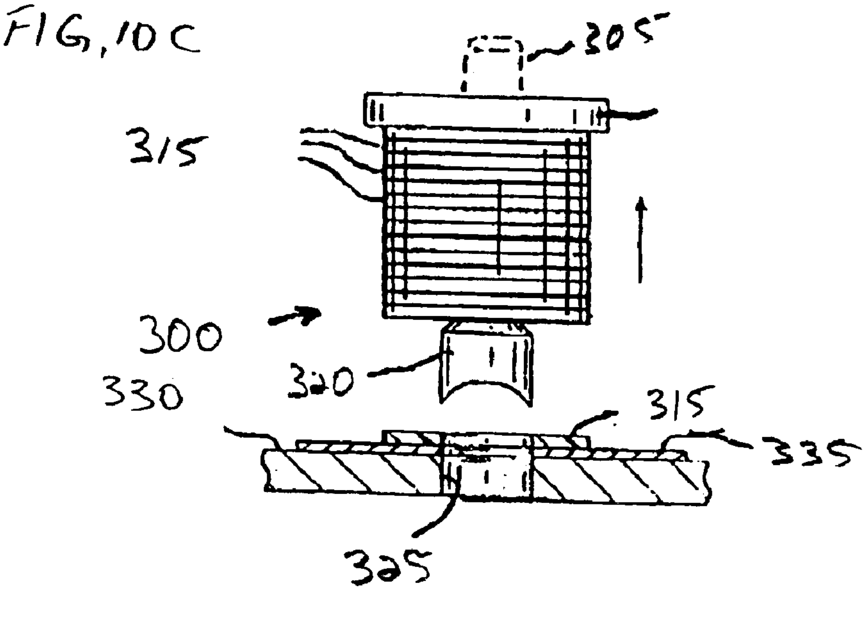
Figure 5:
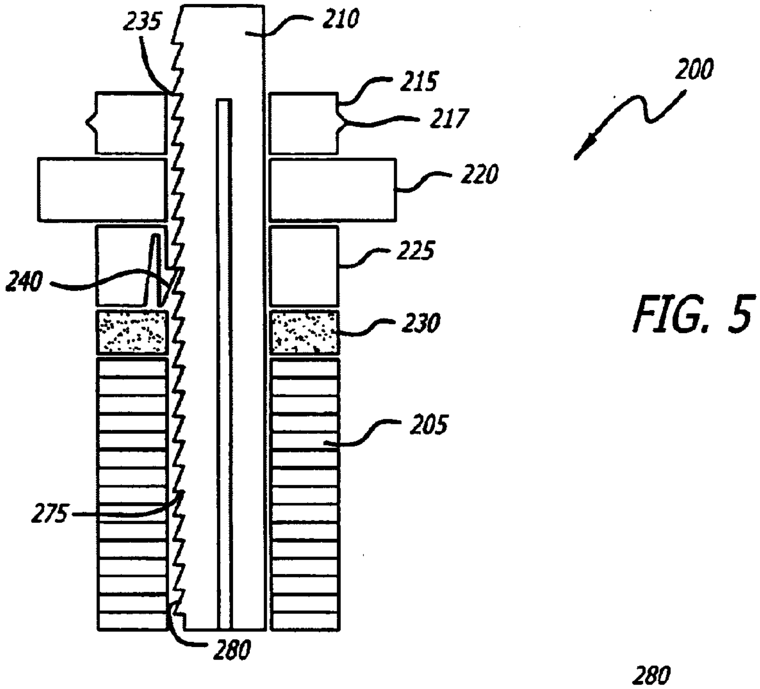
Figure 6:
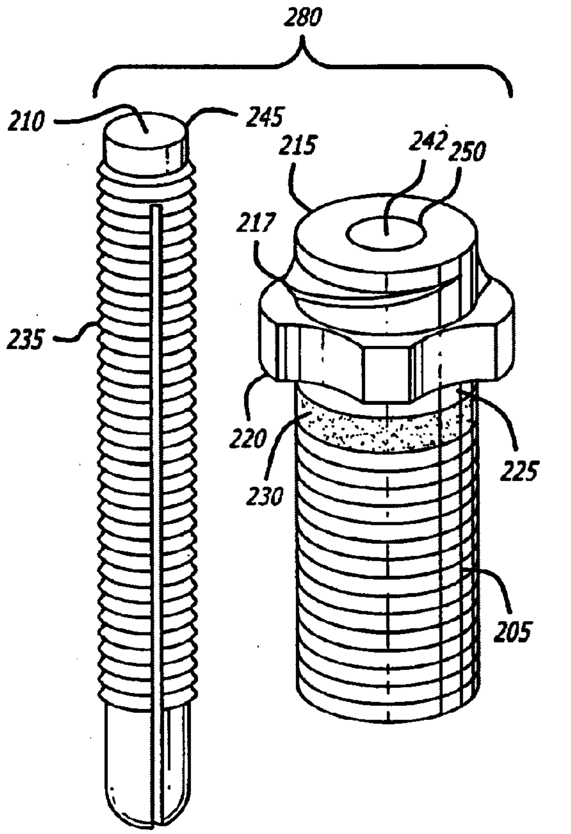
Figure 8A:
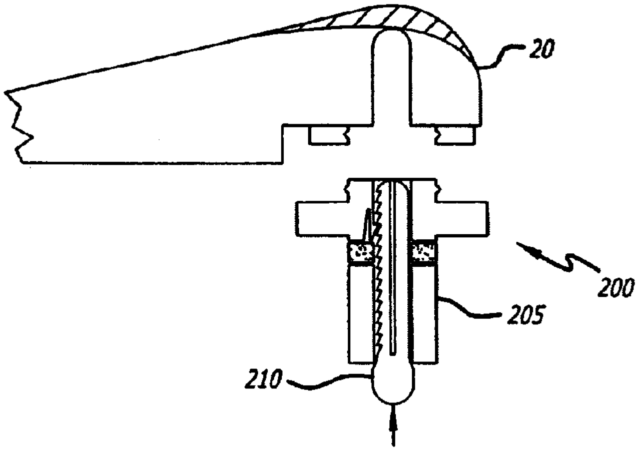
Figure 8B:
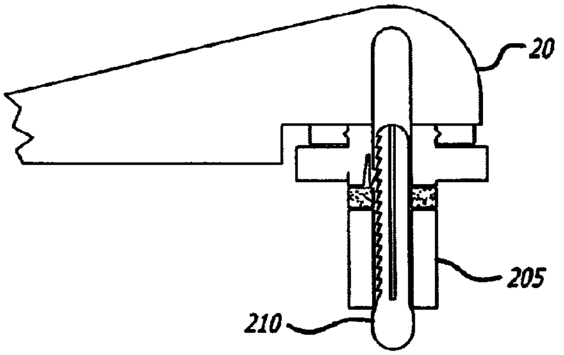
Figure 8C:
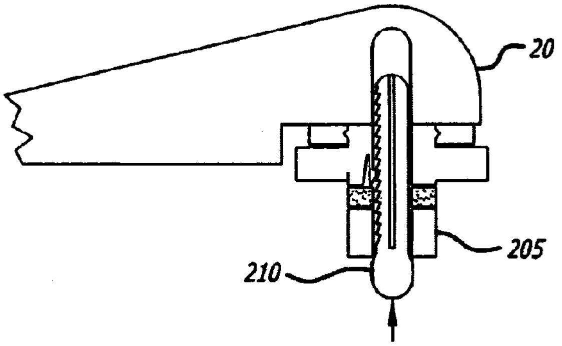
Figure 8D:
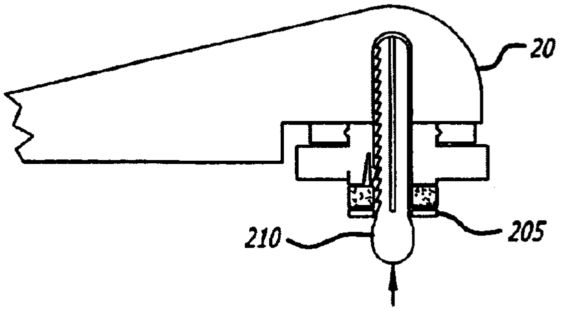

In still another embodiment, the distal ends of shaft 45 or shaft 210 could be configured as hole punches, as shown in FIGS. 10A–10C. In this embodiment, reinforcer dispensing assembly 300 includes a shaft 305, with collar 310 and reinforcers 315 being mounted on shaft 305 as described previously. The distal end of shaft 315 is configured as a hole punch. As shown in FIG. 10B, downward movement of the reinforcer dispensing assembly 310 places the cutting edges of hole punch 320 in contact with a sheet of paper 335 positioned over strike plate 330. Strike plate 330 includes an opening 325 configured cooperate with hole punch 320 to punch a hole in paper 335 when shaft 305 is pressed sufficiently downwards. Downward movement of shaft 305 also places the lowermost reinforcer 315 in contact with sheet of paper 335. Because the reinforcers are mounted on shaft 305 concentric with hole punch 320, when hole punch 320 is pressed against paper 330, a hole is punched in the paper, and the lowermost reinforces 315 is applied to the sheet of paper 335, thus punching a hole in paper 335 and reinforcing the hole with a reinforcer 315 in one step. As further illustrated by FIG. 10C, upwards movement of the assembly 300 pulls the stack of reinforcers 315 away from the lowermost reinforcer which is adhered to paper 335.

While several particular forms of the invention have been illustrated and described, it will be apparent that various modifications can be made without departing from the spirit and scope of the invention.

I claim:

1. A system for applying reinforcing rings to a sheet of paper, comprising:

a first arm and a second arm, the first and second arms each having a first end and a second end, the first arm being hingedly connected at its second end to the second end of the second arm, the first and second arms each having an inner surface, with the inner surfaces of the first and second arms facing each other;

a strike plate mounted on the inner surface of the second arm adjacent the first end of the second arm;

a reinforcer dispensing assembly mounted adjacent to the first end of the first arm, the reinforcer dispensing assembly positioned to cooperate with the strike plate, the reinforcer dispensing assembly including at least one reinforcing ring removably mounted on a shaft, the shaft having a proximal end and a distal end, the proximal end of the shaft configured to mount removably connect the proximal end of the shaft to the first end of the first arm, and a compression ring mounted on the shaft at a location proximal to the at least one reinforcing ring, the compression ring configured to adjust the position of the of the reinforcing ring on the shaft.

2. The system of claim 1, wherein the reinforcing ring has a top side and a bottom side, and also has an adhesive layer applied to the bottom side.

3. The system of claim 1, wherein the shaft has an outer surface with threads disposed thereon, and the compression ring has a top side and a bottom side and an opening extending therethrough, the opening having an inner wall having threads configured to cooperate with the threads of the shaft such that rotation of the compression ring causes the compression ring to translate along the shaft in a longitudinal direction.

4. The system of claim 1, wherein the shaft has an outer surface with a plurality of ridges disposed thereon, and the compression ring has a top side and a bottom side and an opening extending therethrough, the opening having an inner wall, the compression ring also having a ratchet arm disposed in the opening and configured to cooperate with the plurality of ridges on the shaft to provide one way translation of the compression ring on the shaft to apply pressure on the at least one reinforcing ring to move the at least one reinforcing ring towards the distal end of the shaft, and to prevent movement of the at least one reinforcing ring towards the proximal end of the shaft.

5. The system of claim 1, wherein the reinforcer dispensing assembly is removably attached to the inner surface of the first arm.

6. The system of claim 1, wherein the first arm has a bore having a first diameter disposed on a top surface of the first arm and extending through a portion of the first arm, and a second bore having a second diameter less than the diameter of the first bore, the second bore centered axially in relation to the axis of the first bore, the second bore extending from the first bore through the first arm, and wherein the first diameter is larger than a diameter of the compression ring and the second diameter is smaller than the diameter of the compression ring and larger than a diameter of the at least one reinforcing ring, such that the first and second bores accommodate the insertion of the reinforcer dispensing assembly and allow the distal end of the shaft upon which is mounted the at least one reinforcing ring to protrude from the opening of the second bore on the bottom of the first arm; and further comprising:

a plug having an outer diameter sized to cooperate with the first diameter of the first bore, the plug having a top side and a bottom side, the plug also having a central bore having a diameter greater than a diameter of the shaft extending from the bottom side of the plug into the plug for a selected distance, the plug configured to maintain the reinforcer dispensing assembly within the first bore of the first arm.

7. A reinforcer dispensing assembly, comprising:

a shaft having a proximal end and distal end and an outer surface, the outer surface having a plurality of ridges disposed thereon;

a collar having a central hole extending from a top side to a bottom side of the collar, the central hole sized to receive the shaft and to allow the collar to move longitudinally along the shaft;

a ratchet arm disposed within the central hole and mounted to the collar, the ratchet arm configured to cooperated with the plurality of ridges of the shat to control the movement of the collar along the shaft such that the collar is constrained to move in only one direction on the shaft.

8. The assembly of claim 7, further comprising at least one reinforcing ring removably mounted on the shaft adjacent the distal end of the shaft and at a location on the shaft distal to the location of the collar on the shaft.

9. The assembly of claim 8, wherein the at least one reinforcing ring has a top side and a bottom side, the bottom side having an adhesive layer disposed thereon.

10. The assembly of claim 8, wherein the distal end of the shaft is configured as a hole punch.

* * * * *

UNITED STATES PATENT AND TRADEMARK OFFICE

CERTIFICATE OF CORRECTION

PATENT NO. : 6,863,108 B1
DATED : March 8, 2005
INVENTOR(S) : Hui

It is certified that error appears in the above-identified patent and that said Letters Patent is hereby corrected as shown below:

Delete title page illustrating figure, and substitute therefor new title page illustrating figure (attached).

Delete drawing sheets 1-5, and substitute therefor drawing sheets 1-5, as shown on the attached sheet.

Column 2,
Line 23, delete "method" and insert -- methods --.
Line 46, delete "mount".
Line 50, delete first occurrence of "of the".

Column 3,
Line 49, delete "cooperated" and insert -- cooperate --.
Line 50, delete "shat" and insert -- shaft --.

Column 4,
Line 23, delete "party" and insert -- partly --.
Line 62, delete "attached" and insert -- attach --.
Lines 62 and 67, delete "hold" and insert -- hole --.

Column 5,
Lines 1, 4 and 5, delete "hold" and insert -- hole --.
Line 6, delete "interact maintain" and insert -- interact to maintain --.
Line 14, delete "nut for" and insert -- nut 40 --.
Line 39, after "strike plate 80" delete comma and insert -- . -- (a period).

Column 7,
Line 33, delete "time" and insert -- end --.
Line 38, delete "tom" and insert -- torn --.

Column 8,
Line 31, delete "bottoms".

Column 10,
Line 52, delete "coller" and insert -- collar --.

UNITED STATES PATENT AND TRADEMARK OFFICE

CERTIFICATE OF CORRECTION

PATENT NO. : 6,863,108 B1
DATED : March 8, 2005
INVENTOR(S) : Hui

It is certified that error appears in the above-identified patent and that said Letters Patent is hereby corrected as shown below:

Column 11,
Line 3, delete “configured” and insert -- configured to --.
Line 10, delete “reinforces” and insert -- reinforcer --.
Line 37, delete “mount”.

Column 12,
Line 46, delete “cooperated” and insert -- cooperate --.
Line 46, delete “shat” and insert -- shaft --.

Signed and Sealed this

Sixteenth Day of August, 2005

JON W. DUDAS
*Director of the United States Patent and Trademark Office*

(12) United States Patent
Hui

(10) Patent No.: US 6,863,108 B1
(45) Date of Patent: Mar. 8, 2005

(54) REINFORCING RING APPLICATOR

(76) Inventor: Lap-Sun Hui, 300 Sycamore, Bradbury, CA (US) 91010

(*) Notice: Subject to any disclaimer, the term of this patent is extended or adjusted under 35 U.S.C. 154(b) by 0 days.

(21) Appl. No.: 10/765,747

(22) Filed: Jan. 27, 2004

(51) Int. Cl.[7] .............................................. B32B 31/18
(52) U.S. Cl. ...................... 156/513; 156/515; 156/530; 156/564; 156/565
(58) Field of Search ................................ 156/251, 252, 156/253, 257, 261, 513, 514, 515, 517, 518, 530, 564, 565, 570

(56) References Cited

U.S. PATENT DOCUMENTS

| | | | | |
|---|---|---|---|---|
| 2,353,232 | A | 7/1944 | Greene | |
| 2,441,821 | A | 5/1948 | Kendall | |
| 2,512,822 | A | 6/1950 | Barsh | |
| 2,561,387 | A | 7/1951 | Lo Forese | |
| 2,583,944 | A | 1/1952 | Hirszson et al. | |
| D193,231 | S | 7/1962 | Klein | |
| 3,898,919 | A | 8/1975 | Grimaldi, Jr. | |
| 4,007,653 | A | 2/1977 | Cady | |
| 4,072,554 | A | 2/1978 | McKibben | |
| 4,285,531 | A | 8/1981 | Balsamo | |
| 4,289,565 | A | 9/1981 | Wilkins | |
| 4,310,379 | A | 1/1982 | Harrison | |
| 4,431,325 | A | 2/1984 | Colby | |
| 4,662,770 | A | 5/1987 | Block | |
| 4,687,536 | A * | 8/1987 | Hiramatsu et al. | 156/556 |
| 4,713,995 | A | 12/1987 | Davi | |
| 4,746,394 | A | 5/1988 | Sueta et al. | |
| 4,826,561 | A | 5/1989 | Carroll | |
| 4,853,268 | A | 8/1989 | Hansen | |
| 4,909,893 | A | 3/1990 | Lee | |
| 5,125,350 | A | 6/1992 | Frye et al. | |
| 5,188,694 | A | 2/1993 | Hashida et al. | |
| 5,340,229 | A | 8/1994 | Schwartzman | |
| 5,364,200 | A | 11/1994 | Russo et al. | |
| 5,658,421 | A | 8/1997 | Carroll | |
| D390,773 | S | 2/1998 | Harrington, Jr. | |
| 6,106,915 | A | 8/2000 | Ruben | |
| 6,206,070 | B1 | 3/2001 | Salmon | |

* cited by examiner

*Primary Examiner*—James Sells
(74) *Attorney, Agent, or Firm*—Fulwider Patton Lee & Utecht, LLP

(57) ABSTRACT

An applicator and reinforcer dispensing assembly for reinforcing holes in sheets of paper and other sheet materials that applies flat reinforcement rings about holes formed in those sheets is provided. A plurality of reinforcement rings are stacked one atop each other and are dispensed by the applicator. Various mechanisms for ensuring that the reinforcing rings are properly positioned in the applicator prior to application are also provided. A combination hole punch and reinforcing ring applicator is also provided.

10 Claims, 6 Drawing Sheets

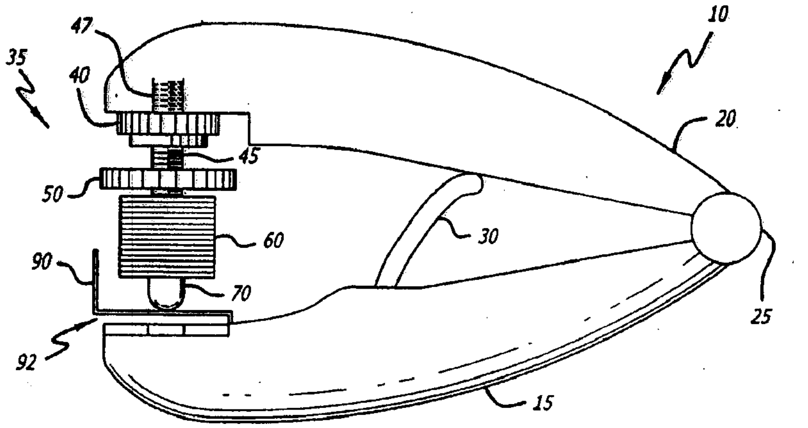

Figure 4:
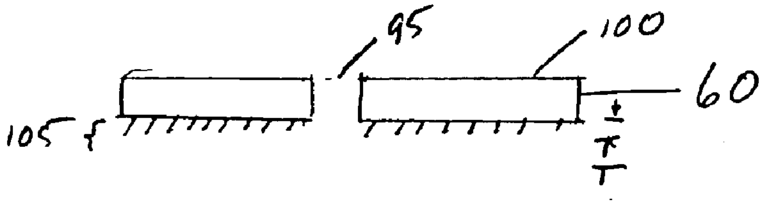
FIG. 4 is a cross-sectional view of a reinforcer in accordance with the present invention.

FIG. 1
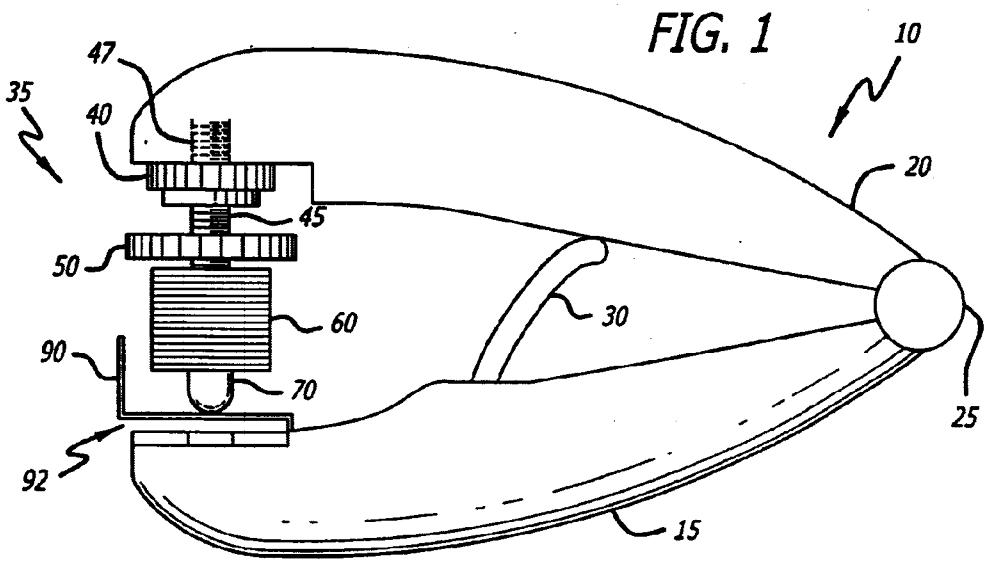
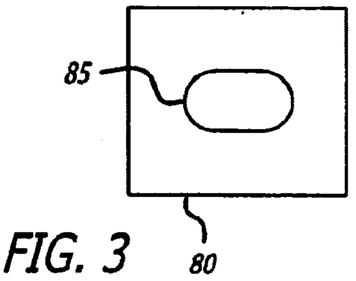
FIG. 3
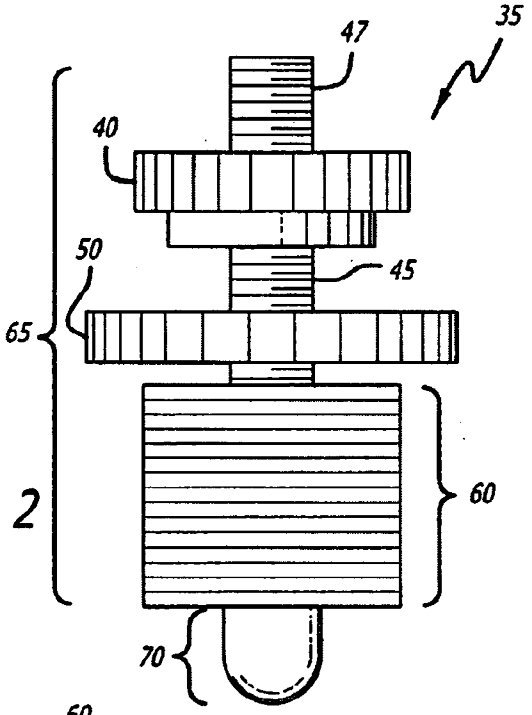
FIG. 2
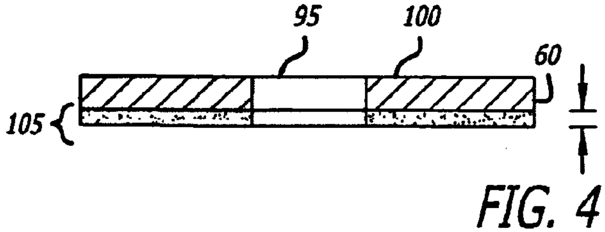
FIG. 4

FIG. 7
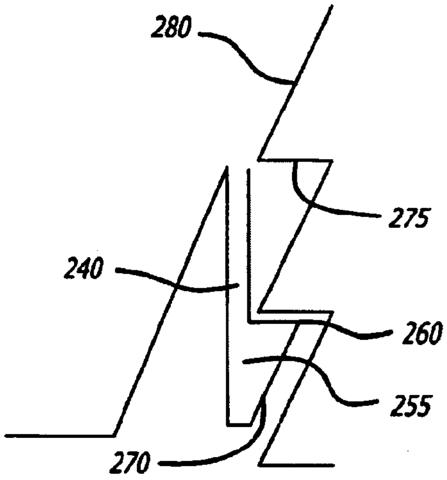
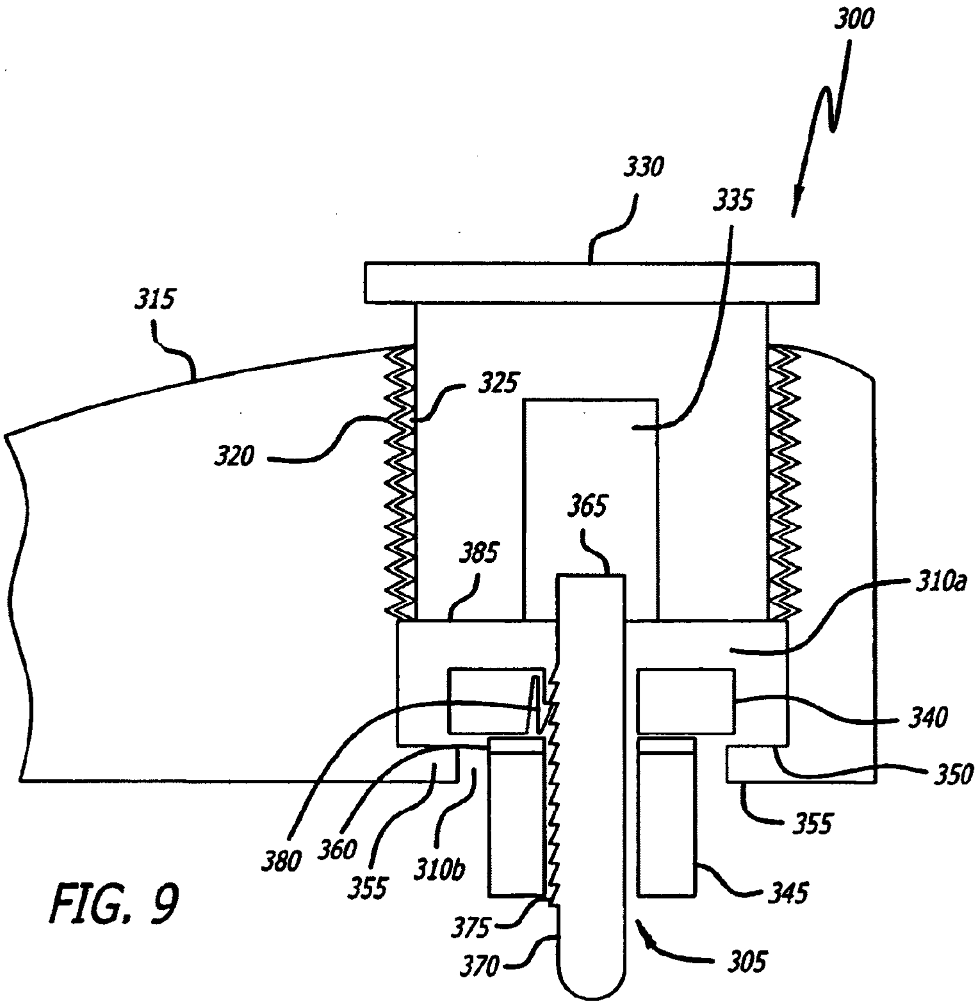
FIG. 9

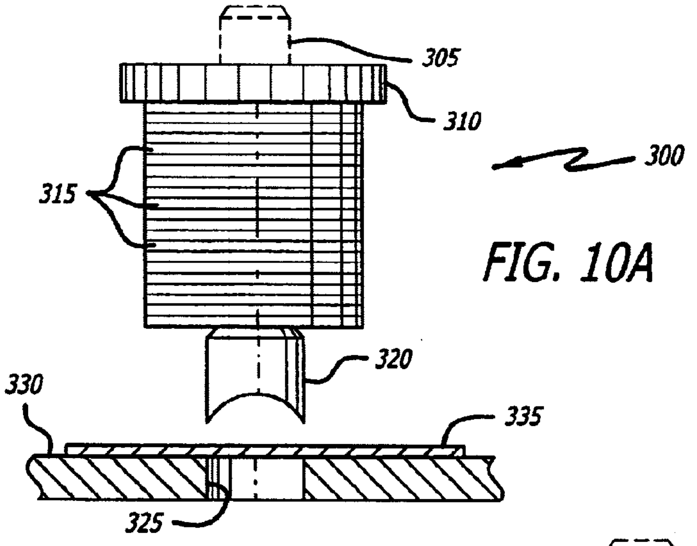
FIG. 10A
FIG. 10B
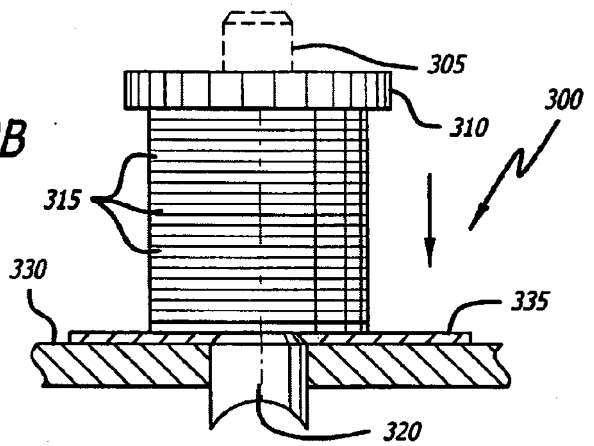
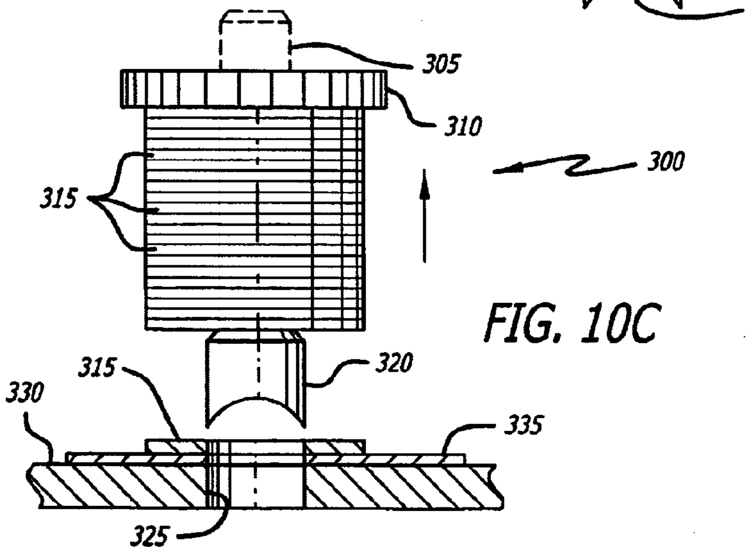
FIG. 10C